United States Patent
Lai et al.

(10) Patent No.: US 9,954,233 B2
(45) Date of Patent: Apr. 24, 2018

(54) ROBUST FUEL CELL STACK SEALING MATERIALS AND METHODS USING THIN ELASTOMERIC SEALS

(71) Applicant: GM Global Technology Operations LLC, Detroit, MI (US)

(72) Inventors: Yeh-Hung Lai, Oakland, MI (US); Anita Luong, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 278 days.

(21) Appl. No.: 15/019,152

(22) Filed: Feb. 9, 2016

(65) Prior Publication Data

US 2017/0229719 A1   Aug. 10, 2017

(51) Int. Cl.

| | |
|---|---|
| *H01M 8/0286* | (2016.01) |
| *H01M 8/2457* | (2016.01) |
| *H01M 8/2483* | (2016.01) |
| *H01M 8/1007* | (2016.01) |
| *H01M 8/0247* | (2016.01) |
| *H01M 8/0258* | (2016.01) |
| *H01M 8/0284* | (2016.01) |
| *H01M 8/1004* | (2016.01) |
| *H01M 8/241* | (2016.01) |
| *H01M 8/242* | (2016.01) |
| *H01M 8/2475* | (2016.01) |
| *H01M 8/0267* | (2016.01) |
| *H01M 8/0297* | (2016.01) |
| *H01M 8/2404* | (2016.01) |
| H01M 8/1018 | (2016.01) |

(52) U.S. Cl.
CPC ....... *H01M 8/0286* (2013.01); *H01M 8/0247* (2013.01); *H01M 8/0258* (2013.01); *H01M 8/0267* (2013.01); *H01M 8/0284* (2013.01); *H01M 8/0297* (2013.01); *H01M 8/1004* (2013.01); *H01M 8/1007* (2016.02); *H01M 8/241* (2013.01); *H01M 8/242* (2013.01); *H01M 8/2404* (2016.02); *H01M 8/2457* (2016.02); *H01M 8/2475* (2013.01); *H01M 8/2483* (2016.02); H01M 2008/1095 (2013.01); H01M 2250/20 (2013.01); H01M 2300/0082 (2013.01); Y02E 60/521 (2013.01); Y02T 90/32 (2013.01)

(58) Field of Classification Search
CPC ............. H01M 8/0289; H01M 8/2404; H01M 8/2457; H01M 8/2483; H01M 8/1007; H01M 8/0247; H01M 8/0258; H01M 8/0267; H01M 8/0284; H01M 8/0297; H01M 8/1004; H01M 8/241; H01M 8/2475
See application file for complete search history.

*Primary Examiner* — Oi K Conley
(74) *Attorney, Agent, or Firm* — Quinn IP Law

(57) ABSTRACT

A fuel cell stack with a bipolar plate assembly and a method of assembling a fuel cell stack such that reactant or coolant leakage is reduced. Bipolar plates within the system include reactant channels and coolant channels that are fluidly coupled to inlet and outlet flowpaths, all of which are formed within a coolant-engaging or reactant-engaging surface of the plate. One or more thin or low aspect-ratio microseals are also formed on a metal bead that is integrally-formed on a surface of the plate and is used to help reduce leakage by maintaining fluid isolation of the reactants and coolant as they flow through their respective channels and flowpaths that are defined between adjacently-placed plates. By delaying the activation of the adhesive bond formed between the microseal and an adjacent surface within the fuel cell until after the aligned cell assemblies have been compressively supported in a stack housing, the ability of the microseal and its adjacent surface to avoid reactant or coolant leakage is enhanced.

17 Claims, 5 Drawing Sheets

ROBUST FUEL CELL STACK SEALING MATERIALS AND METHODS USING THIN ELASTOMERIC SEALS

BACKGROUND OF THE INVENTION

The present invention relates generally to an apparatus and method for improved reactant and coolant flow sealing within joined or fluidly-cooperating fluid-delivery plates used in a fuel cell assembly, and more particularly to the use of a microseal disposed on top of a metal bead that is integrally formed on a cooperating surface of one or both of the plates to provide more effective fluid isolation for the reactant or coolant that is conveyed through channels defined within the plate surfaces.

Fuel cells convert a fuel into usable electricity via electrochemical reaction. A significant benefit to such an energy-producing means is that it is achieved without reliance upon combustion as an intermediate step. As such, fuel cells have several environmental advantages over internal combustion engines (ICEs) for propulsion and related motive applications. In a typical fuel cell—such as a proton exchange membrane or polymer electrolyte membrane (in either event, PEM) fuel cell—a pair of catalyzed electrodes are separated by an ion-transmissive medium (such as Nafion™) in what is commonly referred to as a membrane electrode assembly (MEA). The electrochemical reaction occurs when a first reactant in the form of a gaseous reducing agent (such as hydrogen, $H_2$) is introduced to and ionized at the anode and then made to pass through the ion-transmissive medium such that it combines with a second reactant in the form of a gaseous oxidizing agent (such as oxygen, $O_2$) that has been introduced through the other electrode (the cathode); this combination of reactants form water as a byproduct. The electrons that were liberated in the ionization of the first reactant proceed in the form of direct current (DC) to the cathode via external circuit that typically includes a load (such as an electric motor, as well as various pumps, valves, compressors or other fluid delivery components) where useful work may be performed. The power generation produced by this flow of DC electricity can be increased by combining numerous such cells into a larger current-producing assembly. In one such construction, the fuel cells are connected along a common stacking dimension—much like a deck of cards—to form a fuel cell stack.

In such a stack, adjacent MEAs are separated from one another by a series of reactant flow channels, typically in the form of a gas impermeable bipolar plate (also referred to herein as a flow field plate) that—in addition to promoting the conveyance of reactants, coolant and byproducts—provides structural support for the MEA, as well as electrical current collection or conveyance. In one common form, the channels are of a generally serpentine layout that covers the majority of the opposing generally planar surfaces of each plate. The juxtaposition of the plate and MEA promotes reactant flow to or from the fuel cell, while additional channels (that are fluidly decoupled from the reactant channels) may also be used for coolant delivery. In one configuration, the bipolar plate is itself an assembly formed by securing a pair of thin metal sheets (called half plates) that have the channels stamped or otherwise integrally formed on their surfaces. The various reactant and coolant flowpaths formed by the channels on each side typically convene at a manifold (also referred to herein as a manifold region or manifold area) defined on one or more opposing edges of the plate. Examples of all of these features—as well as a typical construction of such bipolar plate assemblies that may be used in PEM fuel cells—are shown and described in commonly-owned U.S. Pat. Nos. 5,776,624 and 8,679,697 the contents of which are hereby incorporated by reference in their entirety.

It is important to avoid leakage and related fluid crosstalk within a PEM fuel cell stack. To overcome such leakage, the Assignee of the present invention has applied a relatively thick elastomeric sealant onto discrete portions of the relatively planar surface of the bipolar plate. While useful in establishing the requisite degree of sealing, the thick nature of the sealants makes such an approach unfeasible in actual fuel cell stacks that are made up of more than one hundred bipolar plate and MEA assemblies, as volumetric concerns—especially in the confined spaces of an automobile engine compartment—become paramount. Moreover, the difficulty of ensuring a consistent, repeatable placement of the seal makes this approach cost-prohibitive.

In an alternate to using thick elastomeric sealants, the Assignee of the present invention has developed integrally-formed bipolar plate sealing where stampings formed in the plate surfaces in a manner generally similar to those used to form the reactant and coolant channels produce gasket-like outward-projecting metal beads to establish discrete contact points between adjacent plate surfaces. These beads (which may be formed to define a cross sectional rectangular, trapezoidal, semi-spherical or other related shape) are more compatible with high-volume production needs than that of the deposition of a thick elastomeric sealant such as mentioned above. In particular, the Assignee applied a thin, relatively soft, compliant sealing layer where in an ideal situation there is no variation in the thickness or structural stiffness along the length of the sealant such that the nominal sealing pressure (which is based on the applied stacking force per sealant length divided by the sealant width) should be substantially uniform. Nevertheless, proper sealing and avoidance of pressure variations along the length of the bead is difficult to achieve, especially in view of the inherent vagaries of fuel cell stack manufacturing where both dimensional tolerances of the formed beads as well as the misalignment of one hundred or more individual cells within the stack are present such that variation of seal effective pressure and concomitant leakage along the length of the bead around one or more regions of the plate is unavoidable.

An additional difficulty stems from how the sealant is adhered within the bipolar plate assembly. In the previously investigated approach by the Assignee discussed above, the sealant first forms an adhesive bond between itself and the bead substrate. As mentioned above, while conventional thick sealants tend to be relatively insensitive to such bonding, the present inventors have discovered that any attempt to reduce the thickness of the sealant results in significant sealing pressure sensitivity to how the sealant is constrained at the interface between it and the underlying substrate. For example, in the case of a 1.1 mm wide sealant that is relatively thin (i.e., about 0.15 mm high), the locations that lose adhesion or have no adhesion to begin with may exhibit pressures significantly lower than that of the same seal with perfect adhesion. A further difficulty arises out of the fact that the long service life associated with an operating fuel cell stack in a harsh automotive environment often leads to some debonding along the length of the cured sealant. Previous studies conducted by the present inventors have shown that if a spot or section loses adhesion during the fuel cell stack lifetime, that area can lose 75% of the sealing pressure, which can lead to unacceptably high levels of reactant or coolant leakage.

SUMMARY OF THE INVENTION

In view of the above difficulties, the present inventors have discovered a robust way to guard against the loss or non-uniform adhesion of a sealant that is being used within a bipolar plate assembly or fuel cell stack that employs such bipolar plates, as well as a way to use such a sealant in conjunction with integrally-formed metal beads. According to an aspect of the present invention, a method of forming a fuel cell stack is disclosed. The method includes providing a pair of plates that are used in a bipolar plate assembly, where each of the plates includes one or more of a reactant channel, reactant manifold, coolant channel and coolant manifold defined on its surface, as well as an integrally-formed metal bead projecting from the surface. The topmost part of the metal bead defines a generally planar gasket-like engaging portion that is configured to facingly cooperate with one of a compatible surface of a facingly-adjacent plate, MEA or related surface that has a microseal disposed thereon. In situations where the microseal is formed on the metal bead and bonded thereto, the combination is referred to as a metal bead seal (MBS). In one form, the assembly is stacked by placing a first micro seal on the engaging portion of the bead of a first of the plates such that the microseal is cured prior to any stacking or related engagement between adjacent facing surfaces. Because of such curing, the microseal becomes temporarily bonded or tacked—such as through relatively weak van der Waals forces or the like—to the relevant surface (i.e., subgasket, metal bead engaging portion, MEA or a second cured microseal). After this curing, these assemblies are aligned with corresponding MEAs along a stacking dimension and then placed into a compressed state in a housing as a way to put the stack into its final and proper heightwise dimension. Activation of the adhesion that is disposed between the microseal and plate within each assembly (as well as optionally between adjacent assemblies) takes place only after the stack has been substantially assembled and properly aligned and compressively supported in the housing. Such post hoc adhesive activation between the microseals and their adjacent substrate has the effect of permitting the microseals to be more thoroughly and evenly distributed within the final stack. In addition, it helps make the sealing pressure insensitive to any subsequent loss in adhesion that may take place over the operating life of the stack.

Within the present context, the curing of the bulk microseal material and activation of adhesion at the interfaces should be understood as two separate steps where the curing corresponds to the use of heat or a related agent to facilitate crosslinking within the microseal polymer network as a way to produce the desired structure, while the activation of adhesion is to create a substantially permanent chemical bonding between the microseal material and the substrate (specifically, either or both the metal bead and subgasket) to which it is attached. In one preferred form, the engaging portion of the bead of the second of the pair of plates is in contact with the second microseal so that upon cooperative engagement between the pair of plates, the two MBSs contact to provide substantial fluid isolation of a reactant or coolant that upon stack operation will be conveyed through a respective one of the channels or manifolds. In another preferred form, the microseal may be applied to a subgasket that is used to provide leakage reduction at the periphery of the MEA.

In the present context, the term "microseal" is meant to distinguish the thin, low aspect ratio (i.e., less than one) seal of the present invention from those that employ thick (i.e., high aspect ratio of equal to or greater than one) constructions. As mentioned above, relatively thick seals are not economically viable with the large-scale production of fuel cell stacks that include a large number of bipolar plates, MEAs and related components, and are deemed to be outside the scope of the present invention. Further in the present context, an effective seal pressure (or effective sealing pressure or effective pressure, in all cases $P_{eff}$) differs from that of a conventional sealing pressure in that the former takes into consideration deviation in the stiffness or compliance of a deposited microseal that attend the use of such seals in very thin forms. The present inventors have determined that conventional bulk material properties do not apply under these very thin microseal structures due to geometric confinement. For example, the elastomeric material that makes up the normally compliant seal starts to behave in an stiffening manner when the seal is very thin relative to its width; thus, in situations where the seal is relatively wide relative to its height, spatial constraints on the ability of the seal to compress in response to applied loads start to arise. These spatial constraints are more pronounced when the microseal is adhesively bonded to one or more substrates. These effects in turn tend to cause an effective modulus of elasticity ($E_{eff}$) to be significantly higher than that of the bulk property of the elastomeric material that makes up the microseal. Details associated with this increase in $E_{eff}$ and upon sealing pressure $P_{eff}$ may be found in an article entitled *The Effect of Compressibility on the Stress Distributions in Thin Elastomeric Blocks* by Yeh-Hung Lai, D. A. Dillard and J. S. Thornton in *The Journal of Applied Mechanics* (1992) the contents of which are incorporated by reference in their entirety. This higher effective modulus manifests itself as requiring a correspondingly higher amount of compressive load to affect the same degree of microseal compressive displacement. Because fuel cell stacks are typically assembled under a sealing load of between 1 and 6 MPa, limiting microseal displacement (such as through the premature activation of an adhesive placed (or otherwise formed) compressively-engaged components) during the stack assembly process is tantamount to inhibiting the ability of the microseal to conform to irregularities in the substrate (i.e., metal bead, subgasket or MEA) surfaces, which in turn undesirably leads to an increased incidence of leaking. It is this type of inhibited movement that the present invention avoids by freeing up the spatial constraints associated with the seal-to-substrate bonding as discussed herein.

According to another aspect of the present invention, a bipolar plate assembly for a fuel cell system includes a pair of plates each with one or more reactant channels, reactant manifolds, coolant channels and coolant manifolds defined on a surface thereof is disclosed. At least one of the plates defines an integrally-formed metal bead seal that projects from the surface in a manner generally similar to the plate projections that define the reactant or coolant channels.

According to yet another aspect of the present invention, a fuel cell stack is disclosed. The stack includes numerous individual fuel cells aligned and compressibly contained along a stacking axis within a housing. Each of the cells includes a pair of plates in a facingly-adjacent placement of their surfaces, where each surface defines one or more of a reactant channel, reactant manifold, coolant channel and coolant manifold. The surfaces also include an integrally-formed metal bead that projects therefrom to define an engaging portion thereon. MEAs are disposed between at least some of plate pairs; in such case, each of the reactant channels from such pair of plates is placed in fluid communication with a respective anode or cathode within the MEA. A microseal is placed on the engaging portion of at least a first of the pair of plates such that the microseal is substantially cured at a time prior to alignment but not substantially adhesively bonded until after the numerous cells have been compressively contained within the housing. Depending on the nature of the cell construction, such contact from the microseal can be to any one of an adjacent subgasket, MEA, engaging portion of an adjacent bipolar plate assembly and cured microseal that has been deposited on the engaging portion of the adjacent bipolar plate assembly.

These and other aspects or embodiments will become apparent to those of ordinary skill in the art from a reading of the following detailed description and the appended claims.

BRIEF DESCRIPTION OF THE DRAWINGS

The following detailed description of the preferred embodiments of the present invention can be best understood when read in conjunction with the following drawings, where like structure is indicated with like reference numerals and in which the various components of the drawings are not necessarily illustrated to scale.

DETAILED DESCRIPTION OF THE EMBODIMENTS

Figure 1:
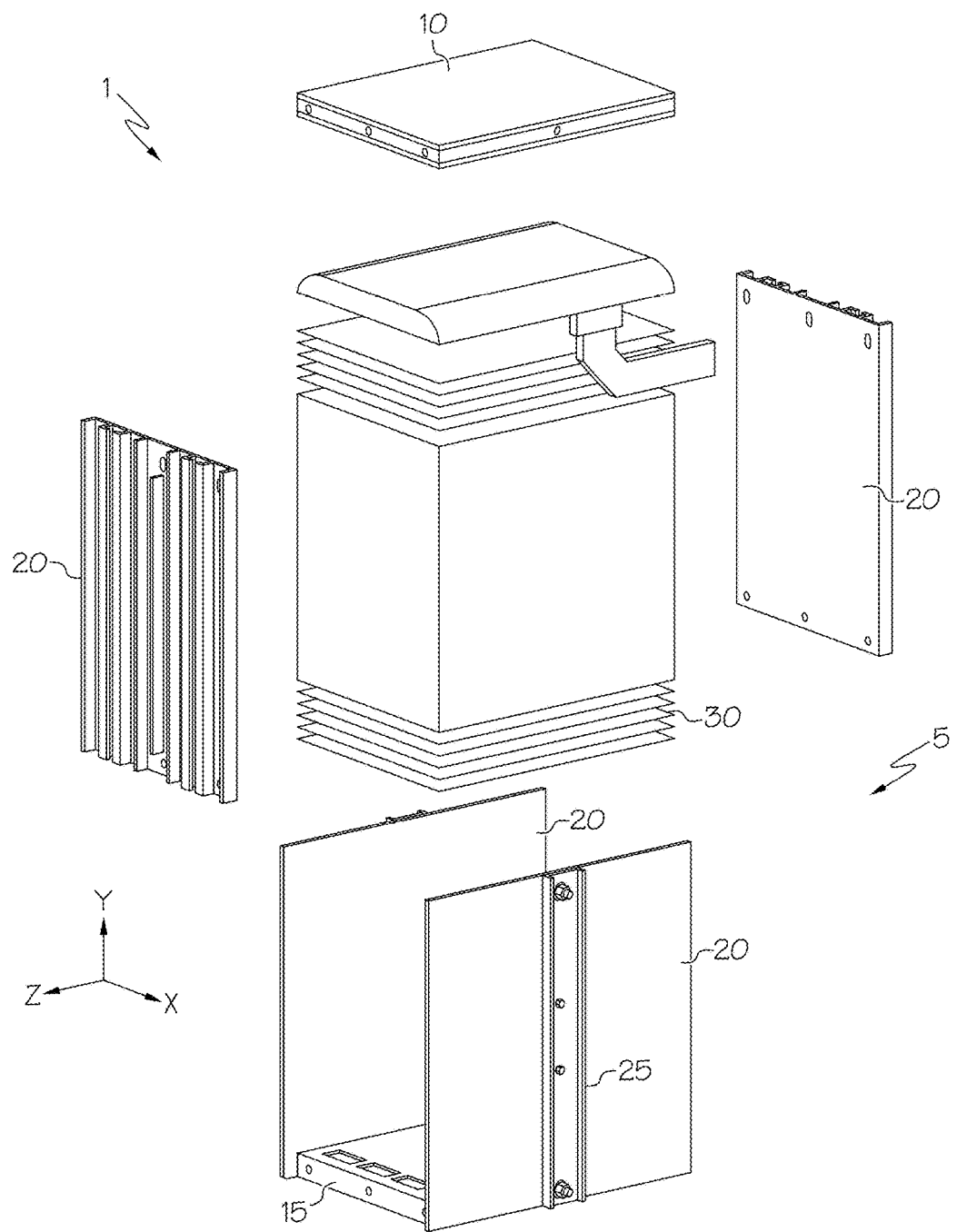
FIG. 1 depicts a schematic exploded view of a fuel cell stack that can be assembled according to an aspect of the present invention.
Figure 2:
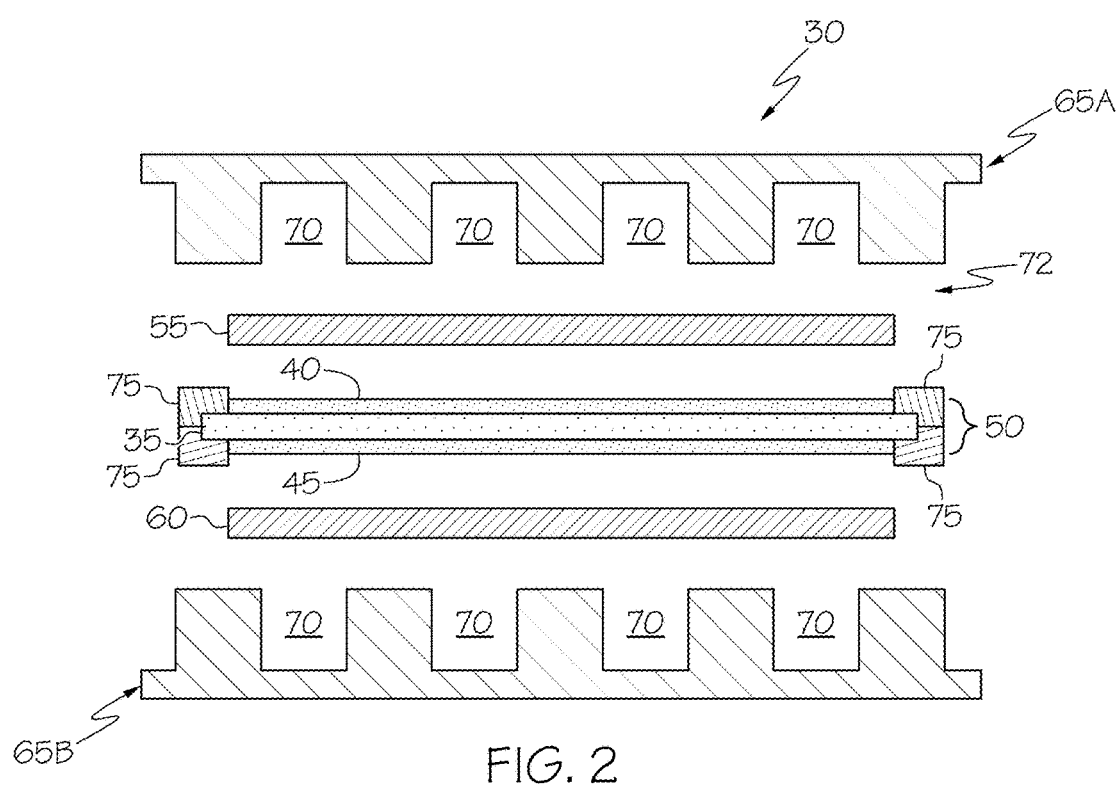
FIG. 2 is a simplified illustration of a partially exploded, sectional view of a portion of a fuel cell with surrounding bipolar plates.
Figure 3:
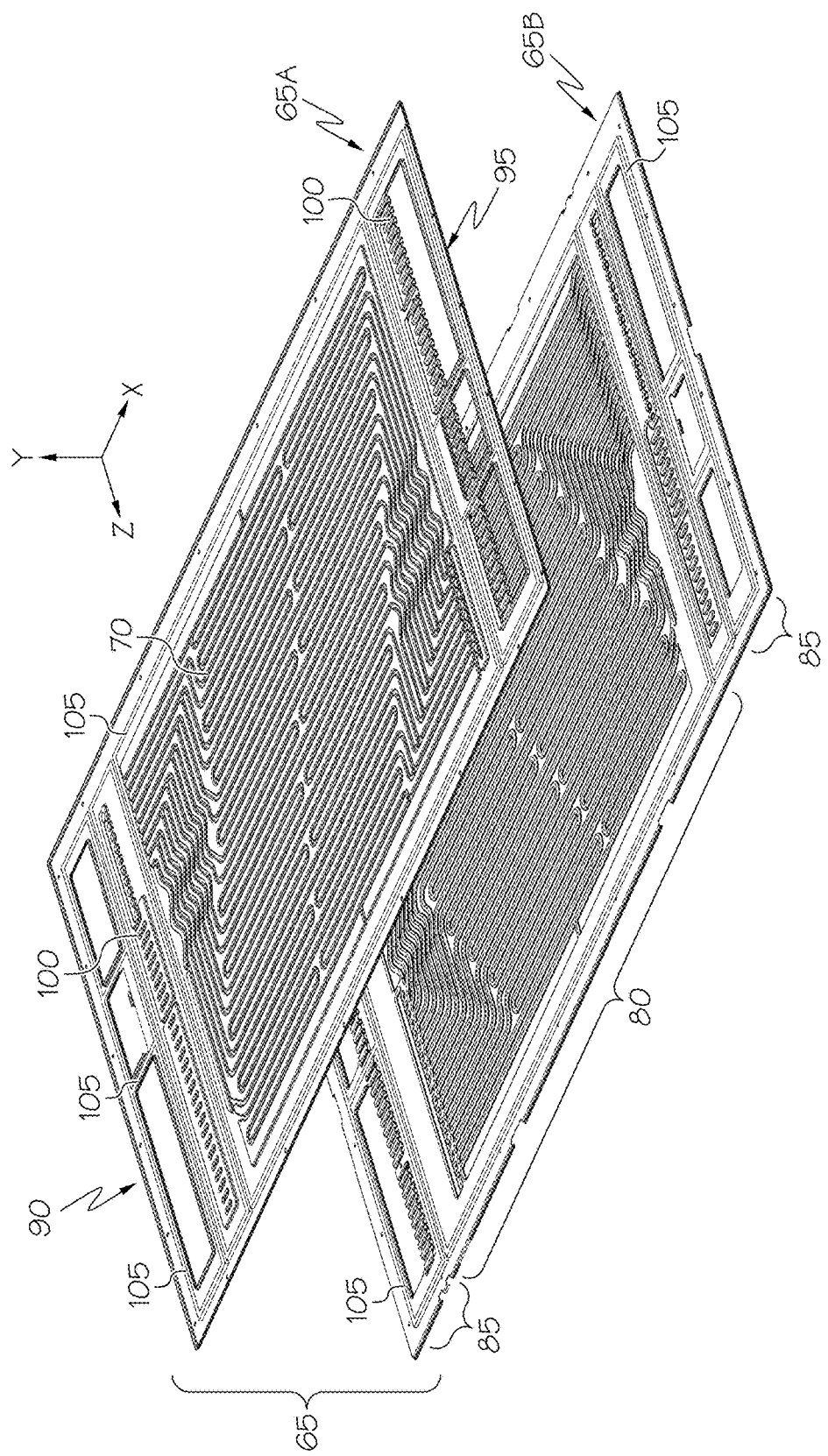
FIG. 3 is a top detailed view of a bipolar plate from FIG. 2 that includes a metal bead that can accommodate a microseal according to an aspect of the present invention.

Referring initially to FIGS. 1 through 3, a simplified view of fuel cell stack 1 in exploded form (FIG. 1), a PEM fuel cell 30 (FIG. 2) and a bipolar plate assembly 65 (FIG. 3) are shown. The stack 1 includes a housing 5 made up of a dry end unit plate 10 and a wet end unit plate 15; these (as well as others, not shown) may help perform the compressive clamping action of the compression retention system of the housing 5; such compression retention system includes numerous bolts (not shown) that extend through the thickness of the stack 1, as well as various side panels 20 and rigid bracketing elements 25 disposed vertically along the stacking direction (the Y axis) for securing the wet end unit plate 15 to the dry end unit plate 10. Stacks of numerous fuel cells 30 are securely held in a compressive relationship along the stacking direction by the action of the bolts, bracketing elements 25 and other components within housing 5. Thus, in the present context, while the stacking axis of the fuel cell 1 may be along a substantially vertical (i.e., Y) Cartesean axis, the majority of the generally planar surfaces of each of the fuel cells 30 resides in the X-Z plane. Regardless, it will be appreciated by those skilled in the art that the particular orientation of the cells 30 within the stack 1 isn't critical, but rather provides a convenient way to visualize the landscape that is formed on the surfaces of the individual plates that are discussed in more detail below.

Referring with particularity to FIGS. 2 and 3, the fuel cell 30 includes a substantially planar proton exchange membrane 35, anode catalyst layer 40 in facing contact with one face of the proton exchange membrane 35, and cathode catalyst layer 45 in facing contact with the other face. Collectively, the proton exchange membrane 35 and catalyst layers 40 and 45 are referred to as the MEA 50. An anode diffusion layer 55 is arranged in facing contact with the anode catalyst layer 40, while a cathode diffusion layer 60 is arranged in facing contact with the cathode catalyst layer 45. Each of diffusion layers 55 and 60 are made with a generally porous construction to facilitate the passage of gaseous reactants to the catalyst layers 40 and 45. Collectively, anode catalyst layer 40 and cathode catalyst layer 45 are referred to as electrodes, and can be formed as separate distinct layers as shown, or in the alternate (as mentioned above), as embedded at least partially in diffusion layers 55 or 60 respectively, as well as embedded partially in opposite faces of the proton exchange membrane 35.

In addition to providing a substantially porous flowpath for reactant gases to reach the appropriate side of the proton exchange membrane 35, the diffusion layers 55 and 60 provide electrical contact between the electrode catalyst layers 40, 45 and a bipolar plate assembly 65 that in turn acts as a current collector. Moreover, by its generally porous nature, the diffusion layers 55 and 60 also form a conduit for removal of product gases generated at the catalyst layers 40, 45. Furthermore, the cathode diffusion layer 60 generates significant quantities of water vapor in the cathode diffusion layer. Such feature is important for helping to keep the proton exchange membrane 35 hydrated. Water permeation in the diffusion layers can be adjusted through the introduction of small quantities of polytetrafluoroethylene (PTFE) or related material.

Although shown notionally as having a thick-walled structure in FIG. 2, the individual plates 65A and 65B (also referred to herein as half-plates) that make up the assembly 65 preferably employ thin sheet-like or foil-like structure (as will be shown and described in more detail below in conjunction with FIG. 3); as such, FIG. 2 should not be used to infer the relative assembly 65 thickness. Simplified opposing surfaces defined by the facingly-adjacent half-plates 65A and 65B are provided to separate each MEA 50 and accompanying diffusion layers 55, 60 from adjacent MEAs and layers (neither of which are shown) in the stack 1. One half-plate 65A engages the anode diffusion layer 55 while a second half-plate 65B engages the cathode diffusion layer 60. The two thin, facing metal sheets that make up the half-plates 65A, 65B define—upon suitable compression and related joining techniques—the plate assembly 65. Each half-plate 65A and 65B (which upon assembly as a unitary whole would make up the bipolar plate 65) defines numerous reactant gas flow channels 70 along a respective plate face. Although bipolar plate 65 is shown (for stylized purposes) defining purely rectangular reactant gas flow channels 70 and surrounding structure, it will be appreciated by those skilled in the art that a more accurate (and preferable) embodiment will employ generally serpentine-shaped channels 70. The tops of the channels define lands 72 that act as engaging surfaces with complementary-shaped lands 72 of facing plates.

In operation, a first gaseous reactant, such as $H_2$, is delivered to the anode side of the MEA 50 through the channels 70 from half-plate 65A, while a second gaseous reactant, such as $O_2$ (typically in the form of air) is delivered to the cathode side of the MEA 50 through the channels 70 from half-plate 65B. Catalytic reactions occur at the anode 40 and the cathode 45 respectively, producing protons that migrate through the proton exchange membrane 35 and electrons that result in an electric current that may be transmitted through the diffusion layers 55 and 60 and bipolar plate 65 by virtue of contact between it and the layers 55 and 60. Related channels (not shown) may be used to convey coolant to help control temperatures produced by the fuel cell 1. In situations where the half-plates 65A, 65B are configured for the flow of coolant, their comparable features to their reactant-conveying plate counterparts are of similar construction and will not be discussed in further detail herein.

Subgaskets 75 (a portion of which is shown in cutaway view) may be disposed in many places within the stack 1 for enhanced sealing. In a preferred form, they are made from a non-conductive and gas impermeable material (such as plastic) that is attached at the perimeter of the MEA 50 to separate the various electronically-conductive layers (such as electrode 40 and gas diffusion layer 55 on the anode side and the electrode 45 and gas diffusion layer 60 on the cathode side). Another key function of the subgasket 75 is to prevent the crossover leak and related mixing of reactants around the edge of MEA 50. In one form, subgasket 75 defines a generally planar frame-like member that is placed peripherally to protect the edge of the MEA 50. As such, the subgasket 75 is preferably placed where the elastomeric seal (discussed below) comes into contact with either the MEA 50 or the facing surface of one or more metal beads (also discussed below). This helps reduce overboard leaks of reactant gases and coolant, as well as their inter-mixing at the manifold area 85. Moreover, subgasket 75—which is preferably between about 50 µm and 250 µm in thickness—is often used to extend the separation of gases and electrons between the catalyst layers 40 and 45 to the edge of MEA 50 as a way to increase the membrane 35 active surface area.

Referring with even particularity to FIG. 3, an exploded view showing two adjacently-stacked half-plates 65A, 65B to form the bipolar plate assembly is shown in more detail. In particular, the individual half-plates 65A, 65B each include both an active area 80 and a manifold area 85, where the former establishes a planar facing relationship with the electrochemically active area that corresponds to the MEA 50 and diffusion layers 55 and 60 and the latter corresponds an edge (as shown) or peripheral (not shown) area where apertures formed through the plates 65A, 65B may act as conduit for the delivery and removal of the reactants, coolant or byproducts to the stacked fuel cells 30. As can be seen from the exploded view of FIG. 3, these two half-plates 65A, 65B may be used to form a sandwich-like structure with the MEA 50 and anode and cathode diffusion layers 55, 60 and then repeated as often as necessary to form the fuel cell stack 1. In one form, one or both of the anode half-plate 65A and cathode half-plate 65B are made from a corrosion-resistant material (such as 304L SS or the like). The generally serpentine gas flow channels 70 form a tortuous path from near one edge 90 that is adjacent one manifold area 85 to near the opposite edge 95 that is adjacent the opposing manifold area 85. As can be seen, the reactant (in the case of a plate 65A, 65B placed in facing relationship with the MEA 50) or coolant (in the case of a plate 65A placed in facing relationship with the back of another plate 65B where coolant channels are formed) is supplied to channels 70 from a series of repeating gates or grooves that form a header 100 that lies between the active area 80 and the manifold area 85 of one (for example, supply) edge 90; a similar configuration is present on the opposite (for example, exhaust) edge 95. In an alternate embodiment (not shown), the supply and exhaust manifold areas can lie adjacent the same edge (i.e., either 90 or 95). In situations where the individual plates 65A, 65B are made from a formable material (such as the aforementioned stainless steel) the various surface features (including the grooves, channels, lands or the like) are preferably stamped through well-known techniques, thereby ensuring that both the channels 70, lands 72 and their respective structure, in addition to the metal beads (which will be discussed in more detail below) are integrally formed out of a single sheet of material.

Figure 5:
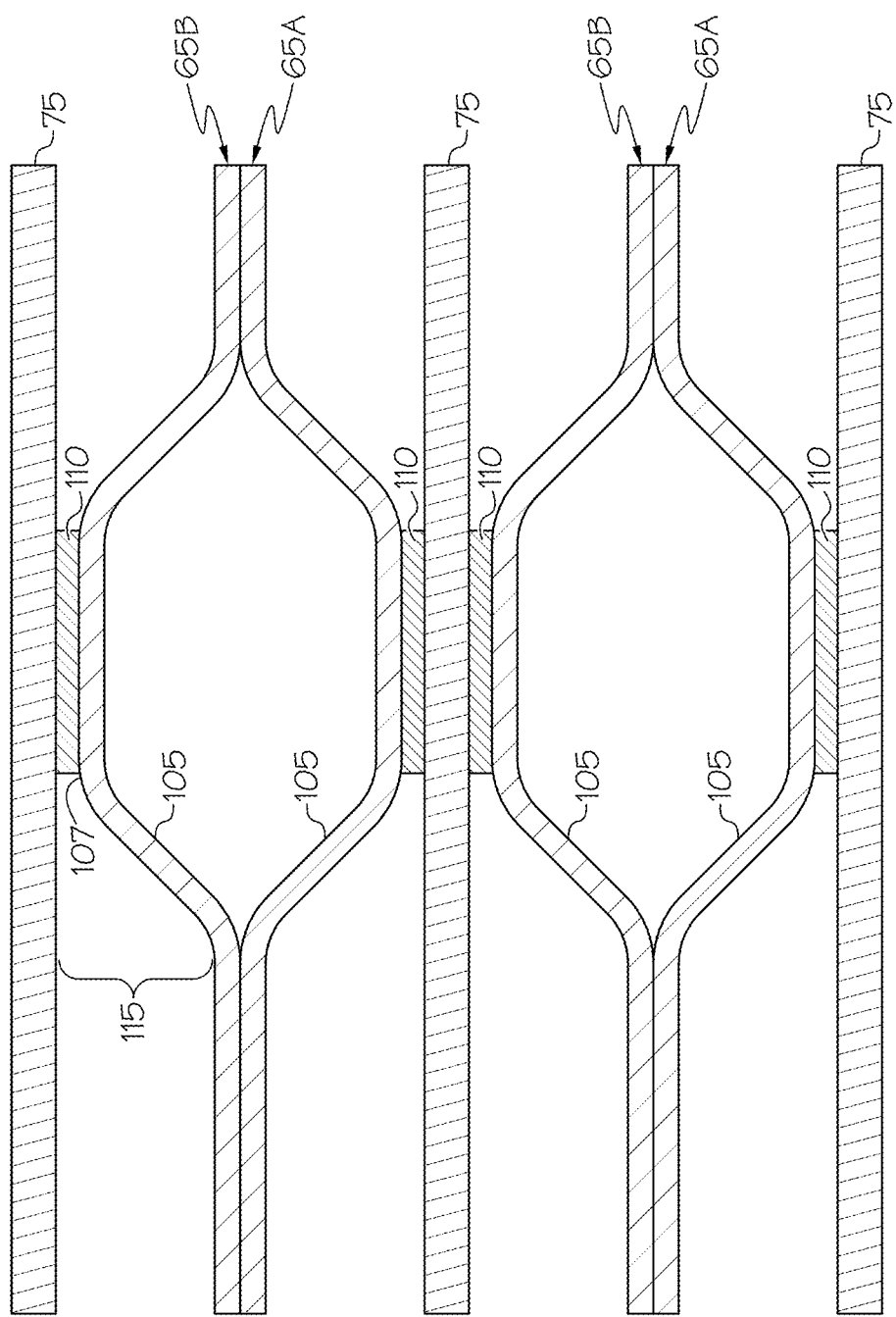
FIG. 5 shows a simplified elevation view of the relative placement of the metal beads, microseals and subgaskets within an adjacently-placed bipolar plate assemblies according to an aspect of the present invention.

Referring next to FIG. 5, in one embodiment, a generally planar portion of a metal bead 105 that makes up the respective plates 65A, 65B is facially engaged with the subgasket 75; this planar engaging portion acts as a gasket to which the subgasket 75 may be joined through a microseal 110. In another embodiment (not shown), a generally planar portion of a metal bead 105 that makes up the respective plates 65A, 65B is facially engaged with the metal bead 105 of the opposing bipolar plates 65B, 65A; both such embodiments are deemed to be within the scope of the present invention. In either configuration, the gasket-like structure of the metal bead 105 and the microseal 110 together define the MBS 115. The gasket-like nature of the metal bead 105 arises out of it being shaped as an upstanding rectangular, trapezoidal (as shown) or slightly curved projection that is formed by stamping from the thin metal material that makes up the respective plates 65A, 65B. The metal beads 105 preferably define height of about 300 µm to 600 µm and a width of between about 1 mm and 4 mm. The top surface defines an engaging portion 107 that is generally similar in construction and function to the lands 72 that may also be integrally formed within one or both of the plates 65A, 65B. As such, the engaging portion 107 corresponds to the region of the metal bead 105 that is designed to be placed into facing contact with the microseal 110, subgasket 75, MEA 50 or adjacent metal bead 105. Significantly, the microseal 110 functions to (a) fill in the surface imperfections of the metal bead 105 or subgasket 75 in the engaging portion 107, (b) induce a more uniform seal force per length along the metal bead 105 length by providing a compliant cushion to make up the non-uniform compressed height of the metal bead 105, (c) prevent fluid (such as reactant) permeation through its bulk and (d) prevent leakage through the interface formed between either (i) the subgasket 75 and microseal 110 or (ii) metal bead 105 and microseal 110, depending on the precise engagement during stack 1 formation. The elastomeric microseal 110 is shown attached to the engaging portion 107, although it will be appreciated by those skilled in the art that the microseal 110 may also be formed onto the surfaces of the subgaskets 75 as well as (or instead of) directly on the metal bead 105; all such variants are deemed to be within the scope of the present invention, as are variants where the microseal 110 is directly mounted to the plate 65A, 65B or other structure.

In one preferred embodiment, microseal 110 is between about 30 µm and 300 µm in thickness and between about 1 mm and 3 mm in width. With such dimensions, the microseal 110 may become deformed under the high compressive loading that accompanies formation of stack 1. Spatial confinement and the inherent incompressibility of the material that makes up the microseal 110 can cause stresses in the microseal, particularly at its interface with the corresponding substrates of the engaging portion 107 of the metal bead 105 or the subgasket 75 to which the microseal 110 is adhered. The inventors have discovered that by substantially delaying the formation of the adhesive bond until after the stack 1 is assembled and compressed, significant stress reduction through mitigating boundary constraints and related effects can be realized. This in turn reduces the likelihood of stress-induced premature microseal 110 failure. In an idealized sense where latent adhesion may be employed according to the present invention, there is no adhesive bonding taking place between the microseal 110 and an adjacent substrate prior to stack 1 assembly and compression; even in situations in the present invention where small, relatively inconsequential deviations from the ideal take place, the degree is limited such that the boundary constraints that would otherwise be associated with a robust degree of relatively prompt adhesion are substantially abated. As such, in the present context, descriptions that pertain to the formation of an adhesive bond (such as the phrase "substantially activating adhesion" between the subgasket 75 and an adjacent substrate) will be understood to encompass those situations where a slight amount of adhesive bonding may develop at the interfacial region between the joined surfaces prior to stack 1 assembly and compression, so long as a substantial majority of such bonding is avoided until such assembly and compression activities have been completed.

In fact, a small residual amount of non-latent adhesion prior to stack 1 assembly may even be beneficial in promoting improved handling of the individual parts prior to assembly and compression. In this way, the residual adhesion that arises out of the microseal 110 bonding is not so great that it acts to set up a permanent face-to-face alignment between adjacent assemblies 65 (or individual components within an assembly 65) prior to stack 1 formation, but enough to avoid relative in-plane sliding between adjacent surfaces as a way to facilitate such handling. To that end, the present inventors have determined that it may be desirable to have some weak form of adhesion between microseals 110 and metal beads 105 after the microseal 110 is cured but before the more permanent adhesion step is activated. As such, during the assembly of stack 1, the interfacial mechanical stress arising from the compression force is expected to break these relatively weak bonds so the microseal 110 can spread along the interfacial region. In one form, relatively weak bonds (such as through van der Waals forces or related interactions) between the microseal 110 and metal bead 105 may be promoted after the microseal 110 is applied and cured as a way to effect this temporary degree of adhesion. In the present context, such weak (or temporary) forms adhesion are to be distinguished from more permanent variants, such as those due to covalent bonds that produce strong chemical bonding. As such, substantially all of the adhesive activation takes place only after all of the fuel cells within the stack 1 have been aligned and compressed together, with the possible exception of the residual adhesion.

The material used to form the microseal 110 is made from resilient plastic or elastomer (including polyacrylate, alhydrated chlorosulphonated polyethylene, ethylene acrylic, chloroprene, chlorosulphonated polyethylene, ethylene propylene, ethylene vinyl acetate, perfluoroelastomer, fluorocarbon, fluorosilicone, hydrogenated nitrile, polyisoprene, microecllular polyurethane, nitrile rubber, natural rubber, polyurethane, styrene-butadiene rubber, TFE/propylene, silicone, carboxylated nitrile or the like), and is preferably applied by a screen printing process known in the art, although other approaches, such as pad printing, injection molding or other deposition techniques may also be used. As mentioned above, in a preferred form, the layer formed by the microseal 110 has a thickness of between about 30 and 300 μm, while a preferred width across the engaging portion 107 is between about 1 mm and 3 mm. In a more particular form, the material used in the microseal 110 includes least silicone (for example, in the form of a vinyl polydimethylsiloxane, PDMS), a structural reinforcement (such as silica, $SiO_2$), a linkage catalyst (such as a Pt-bearing catalyst for vinyl-SiH linkage) and an adhesion promoter (such as 1,2 Bis(triethoxysilyl)ethane). By using one of these preferred formulations, the microseal 110 exhibits a two-part property the first of which promotes prompt curing and structural setup, while the second delays the formation of the interfacial adhesive bond until after assembly and compression of the fuel cell stack 1. Details associated with these materials—as well as the use of screen printing to deposit them on a suitable metal bead 105 or subgasket 75 substrate—may be found in concurrently-filed U.S. patent application Ser. No. 15/019,100 (hereinafter the '100 application) entitled SEAL MATERIAL WITH LATENT ADHESIVE PROPERTIES AND A METHOD OF SEALING FUEL CELL COMPONENTS WITH SAME that is owned by the Assignee of the present invention and the contents of which are incorporated herein by reference in their entirety. Additional screen printing features unique to the formation of seals are disclosed in an exemplary form in U.S. Pat. No. 4,919,969 to Walker entitled METHOD OF MANUFACTURING A SEAL, the contents of which are incorporated by reference in their entirety herein.

Figure 4:
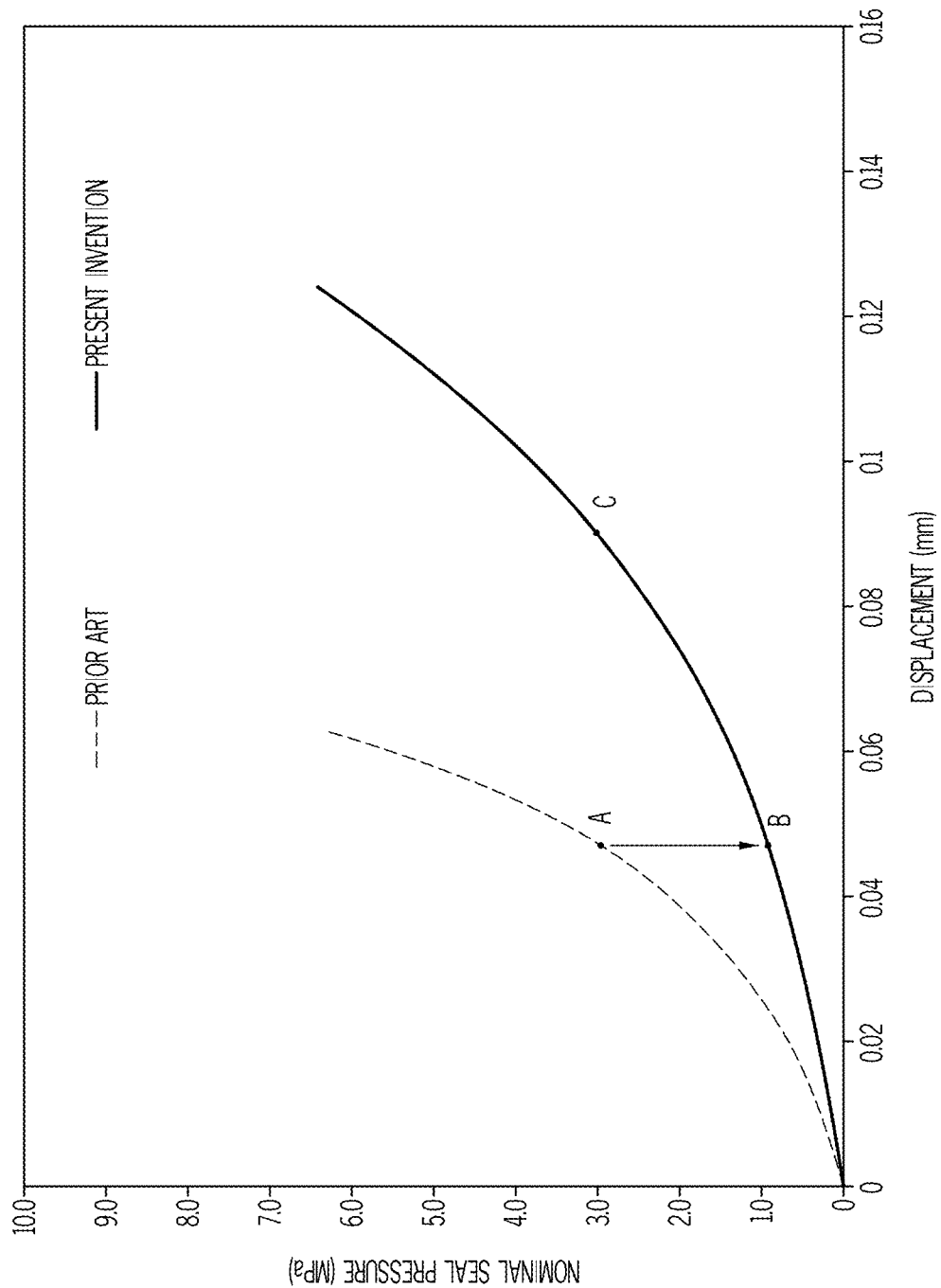
FIG. 4 is graph showing how avoiding the formation of an adhesive bond between the microseal and a bipolar plate assembly substrate prior to individual cell stacking, alignment and compression according to an aspect of the present invention improves leakage prevention.

Referring next to FIG. 4, a graph depicting predicted seal pressure versus displacement is shown as an example to demonstrate the improvement of the present invention over the prior art. As mentioned above, nominal seal pressures in a fuel cell stack are between about 1 to 6 MPa. In both the prior art and present invention cases shown in the chart, the microseal width and thickness values were set to 1.1 mm and 0.15 mm, respectively. In the prior art case, the adhesion between the microseal and the metal bead is activated before the cell is assembled and reaches a 3 MPa nominal sealing pressure at a displacement of 0.046 mm (which corresponds to location A), whereas in the case of the present invention, the adhesion between the microseal 110 and metal bead 105 is activated after the microseal 110 is cured; this too was subjected to a 3 MPa nominal sealing pressure, this time to a displacement of 0.092 mm (which corresponds to location C). As such, the present invention requires more displacement for the same 3 MPa sealing pressure; this in turn beneficially allows the microseal 110 the opportunity to move around during the alignment, stacking and (at least) portions of the compressing process such that it fills in all of the gaps and irregularities between the adjacent metal beads 105 of the joined bipolar plates (such as plates 65A and 65B from FIG. 2). Another advantage of the present invention is in its ability to maintain the sealing pressure in the event of adhesion loss (which corresponds to arrow going from location A to location B) during stack 1 lifetime. It is known in a fuel cell stack that the distance between the adjacent bipolar plates is typically maintained as a constant, which would result in a constant displacement being applied to the metal bead 105 and microseal 110 of the present invention. When a conventional sealant loses its adhesion, it will spread along the interfacial region, which in turn results in a decrease of the sealing pressure from 3 MPa to less than 1 MPa, as depicted moving from location A to location B. On the other hand, the sealing pressure of the sample from the present invention does not decrease in the event of adhesion loss since the relatively adhesionless interface that is still present during the alignment and compression steps allows the microseal 110 to spread laterally along the interface during the stack assembly process, thereby settling into its final shape and dimension at the time of stack formation and subsequent adhesive bond formation. Moreover, excessive sealing pressure (which may arise, for example, when trying to achieve the same nominal pressure in prior art case by compressing to a large displacement) has detrimental effects on not just the microseal 110, but other components within the stack 1 as well, particularly in the formation of high material stresses, creep or the like.

Although not shown, one particular application for a system based on a stack of PEM fuel cells 1 could be an automobile or related vehicle. Within the present context, it will be appreciated that the term "vehicle" may apply to car, truck, van, sport utility vehicle (SUV) or other such automotive forms such as buses, aircraft, watercraft, spacecraft and motorcycles; all are deemed to be made cooperative with the present invention for the purposes of generating propulsive or motive power.

It is noted that terms like "preferably", "generally" and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Likewise, the terms "substantially" and "approximately" and their variants are utilized herein to represent the inherent degree of uncertainty that may be attributed to any quantitative comparison, value, measurement or other representation. As discussed above with particularity to ways to ensure that no more than weak, temporary forms of adhesion are used between adjacent microseals 110 and their associated substrates, the term "substantially" when used to modify the assembly of the fuel cell stack 1 is utilized herein to represent that some of these temporary or residual adhesive means may be used herein without resulting in a change in the basic function of the subject matter at issue; as such, by including some of these weaker, more temporary ways to hold the various stack 1 components in place during assembly do not detract from the fact that the significant (i.e., more permanent) form of adhesion is not used until such time as the various stacked cells have been aligned, pressed together and secured within the stack 1.

Having described the invention in detail and by reference to specific embodiments, it will nonetheless be apparent that modifications and variations are possible without departing from the scope of the invention defined in the appended claims. In particular it is contemplated that the scope of the present invention is not necessarily limited to stated preferred aspects and exemplified embodiments, but should be governed by the appended claims.

We claim:

1. A method of forming a fuel cell stack, the method comprising:
   providing a pair of plates of a bipolar plate assembly, each of said plates comprising:
      at least one of a reactant channel, reactant manifold, coolant channel and coolant manifold defined on a surface thereof; and
      an integrally-formed bead projecting from said surface, said bead defining an engaging portion thereon;
   curing a microseal that has been deposited on said engaging portion of at least a first of said pair of plates;
   aligning said pair of plates into facingly-adjacent cooperation with one another along a stacking dimension such that said at least one cured microseal contacts a surface from the group consisting of (a) a subgasket, (b) a membrane electrode assembly, (c) an engaging portion of a second of said pair of plates and (d) a cured microseal that has been deposited on said engaging portion of second a first of said pair of plates;
   compressively forming a stack of said assemblies that are aligned along said stacking dimension such that upon cooperative engagement between said pair of plates of each of said assemblies, said engaging portions and any of said cured microseal disposed therebetween come into contact with said surface to provide substantial fluid isolation of a reactant or coolant that upon operation of said stack will be conveyed through a respective one of said channels or manifolds defined by said bead; and
   substantially activating adhesion between said first contacted surfaces within each of said aligned assemblies only after said aligned assemblies have been compressively supported in said housing.

2. The method of claim 1, wherein said curing of said microseal takes place on said engaging portion such that substantially no adhesion is formed between them until after said compressively forming of said stack.

3. The method of claim 1, wherein said microseal defines an as-applied thickness of between about 30 µm and about 500 µm.

4. The method of claim 1, wherein said microseal defines an as-applied width of between about 0.5 mm and about 3.0 mm.

5. The method of claim 1, wherein said microseal comprises an elastomer selected from the group consisting of polyacrylate, alhydrated chlorosulphonated polyethylene, ethylene acrylic, chloroprene, chlorosulphonated polyethylene, ethylene propylene, ethylene vinyl acetate, perfluoroelastomer, fluorocarbon, fluorosilicone, hydrogenated nitrile, polyisoprene, microecllular polyurethane, nitrile rubber, natural rubber, polyurethane, styrene-butadiene rubber, TFE/propylene, silicone and carboxylated nitrile.

6. The method of claim 5, wherein said placing a first microseal comprises depositing said first microseal by a method from the group consisting of screen printing, pad printing, molding or dispensing.

7. The method of claim 5, wherein said microseal comprises at least silicone, a structural reinforcement, a linkage catalyst and an adhesion promoter.

8. A bipolar plate assembly for a fuel cell system, said assembly comprising:
   a pair of plates each comprising:
      at least one of a reactant channel, reactant manifold, coolant channel and coolant manifold defined on a surface thereof; and
      an integrally-formed metal bead projecting from said surface, said bead defining an engaging portion thereon; and
   a microseal placed on said engaging portion of at least a first of said pair of plates such that said microseal is substantially cured at a time prior to alignment, stacking and compressive engagement being formed between said assembly and an adjacent bipolar plate assembly, said microseal and said engaging portion cooperative with another surface within said assembly to provide substantial fluid isolation of a reactant or coolant that upon operation of said stack will be conveyed through a respective one of said channels or manifolds defined by said bead.

9. The assembly of claim 8, wherein said another surface is selected from the group consisting of (a) a subgasket, (b) a membrane electrode assembly, (c) an engaging portion of said adjacent bipolar plate assembly and (d) a cured microseal that has been deposited on said engaging portion of said adjacent bipolar plate assembly.

10. The assembly of claim 8, wherein said microseal defines an as-placed thickness of between about 30 μm and about 500 μm.

11. The assembly of claim 8, wherein said microseal defines an as-placed width of between about 0.5 mm and about 3.0 mm.

12. The assembly of claim 8, wherein said microseal comprises an elastomer selected from the group consisting of polyacrylate, alhydrated chlorosulphonated polyethylene, ethylene acrylic, chloroprene, chlorosulphonated polyethylene, ethylene propylene, ethylene vinyl acetate, perfluoroelastomer, fluorocarbon, fluorosilicone, hydrogenated nitrile, polyisoprene, microcellular polyurethane, nitrile rubber, natural rubber, polyurethane, styrene-butadiene rubber, TFE/propylene, silicone and carboxylated nitrile.

13. A fuel cell stack comprising:
a housing; and
a plurality of individual fuel cells aligned within said housing along a stacking axis, each of said cells comprising:
a pair of plates each comprising:
at least one of a reactant channel, reactant manifold, coolant channel and coolant manifold defined on a surface thereof; and
an integrally-formed metal bead projecting from said surface, said bead defining an engaging portion thereon;
a membrane electrode assembly disposed between said pair of plates such that each of said reactant channels from said pair of plates is placed in fluid communication with a respective electrode within said membrane electrode assembly; and
a microseal placed on said engaging portion of at least a first of said pair of plates such that said microseal is substantially cured at a time prior to alignment but not substantially adhesively bonded to at least one of an adjacent (a) subgasket, (b) membrane electrode assembly, (c) engaging portion of an adjacent bipolar plate assembly and (d) cured microseal that has been deposited on said engaging portion of said adjacent bipolar plate assembly until after said plurality of cells have been compressively contained within said housing.

14. The stack of claim 13, wherein said microseal defines an as-placed thickness of between about 30 μm and about 500 μm.

15. The stack of claim 13, wherein said microseal defines an as-placed width of between about 0.5 mm and about 3.0 mm.

16. The stack of claim 13, wherein said microseal comprises an elastomer selected from the group consisting of polyacrylate, alhydrated chlorosulphonated polyethylene, ethylene acrylic, chloroprene, chlorosulphonated polyethylene, ethylene propylene, ethylene vinyl acetate, perfluoroelastomer, fluorocarbon, fluorosilicone, hydrogenated nitrile, polyisoprene, microcellular polyurethane, nitrile rubber, natural rubber, polyurethane, styrene-butadiene rubber, TFE/propylene, silicone and carboxylated nitrile.

17. The stack of claim 16, wherein said microseal comprises at least silicone, a structural reinforcement, a linkage catalyst and an adhesion promoter.

* * * * *